United States Patent [19]

Bacquié

[11] 4,326,450

[45] Apr. 27, 1982

[54] FLUID MECHANISM WITH AXIALLY MOVABLE VALVE-SEAT

[75] Inventor: Serge B. Bacquié, La Croix Saint Ouen, France

[73] Assignee: Poclain Hydraulics, Verberie, France

[21] Appl. No.: 125,534

[22] Filed: Feb. 28, 1980

[30] Foreign Application Priority Data

Mar. 1, 1979 [FR] France ................... 79 05409
Jan. 10, 1980 [FR] France ................... 80 00532

[51] Int. Cl.³ .................................. F01B 13/06
[52] U.S. Cl. ........................... 91/487; 91/491
[58] Field of Search ............. 91/487, 491, 498

[56] References Cited

U.S. PATENT DOCUMENTS 3,090,361  5/1963  Orshansky, Jr. ............. 91/4982

4,171,732 10/1979 Dinson ................... 91/491

FOREIGN PATENT DOCUMENTS 1432268  2/1966  France ................... 91/485
2359277  2/1978  France ................... 91/491

Primary Examiner—William L. Freeh
Attorney, Agent, or Firm—Edward D. O'Brian; K. H. Boswell

[57] ABSTRACT

The invention relates to a fluid mechanism supplied with pressurized fluid by means of a "dis-engageable" valve-seat. Such mechanism further comprises a controlled and independent device for re-engaging the said valve-seat. The invention finds an application in the production of a hydraulic relief engine for use on a trailer pulled by a tractor.

10 Claims, 5 Drawing Figures

FLUID MECHANISM WITH AXIALLY MOVABLE VALVE-SEAT

The invention has been devised for a very special field, to be described hereafter, which is that of hydraulic relief engines. But it has a more general object which is that of pressurized fluid mechanisms, whether the fluid is a pressurized liquid, or a compressed gas, and whether the said mechanism is an engine, or a pump or a compressor.

The special problem arising is the following one.

The use of a hydraulic relief engine has been essentially aimed at obtaining a torque complementary to the normal torque, and this for periods of time during which the driving speed is considerably less than the normal driving speed. An example of such a use is that of a trailer coupled to a tractor and called upon to move intermittently and temporarily over bad ground on public work sites. It is advantageous for the wheels of the trailer, in order to allow displacements on such sites to be fitted with a hydraulic engine which operates only on occasions on the said site, and at a small speed of the trailer.

In such cases, it is recommended, for travelling on roads, to "disengage" the movable members from the relief engine or engines. This can be done by adoption of a special constitution for the relief engines, which overcomes the many disadvantages liable to result from "non-disengagement" such as for example: parts wearing down through permanent friction, under working conditions that are abnormal compared to the working conditions for which the hydraulic engine was initially intended; fluid polluted by the abraded metallic particles; unexpected destruction of the parts as a result of such pollution; poor engine outputs due to wear; losses of power and, as a result, of fuel.

Mechanisms of this type are already known, such as those described in French patent application No. 78 15 071.

From the so-called "disengaging" configuration defined for the mechanism, it is of course necessary to be able to pass to a so-called "driving" configuration, in which the engine must be found, in order to be driving and no longer driven, as it was before. The means provided in the priorly known mechanism to produce this "re-engagement" presupposes the existence already of a flow of pressurized fluid. To be confirmed, this assumption necessitates the adoption of an auxiliary pump or the like, the driving of which is independent of the mechanism, and this is not the case with the pumps that are driven at the same time as the vehicle on which they are fitted, when such vehicle is stationary. Now, it is precisely in that configuration that the vehicle drive-assisting mechanism is meant to operate. The difficulty can of course be overcome, but with a more expensive type of unit.

Moreover, even assuming the prior existence of a flow of pressurized fluid, the bores of the valve-seat need to be supplied with a flow which is sufficiently higher than that escaping through the air gap of the said valve-seat, which is then "disengaged", so as to restore the pressure in the said bores. This normally presupposes a strong flow, and therefore is expensive to produce.

The improvement to the prior mechanism which is proposed by the invention consists in providing the valve-seat with a device by way of which its plane face can rest on the plane face of the cylinder block, said device acting before the main flow of fluid, meant to work in the mechanism, is created, and thus, in cancelling the air gap in the valve-seat before the main fluid driving the mechanism starts working.

The invention therefore proposes an improvement to a mechanism constituted by:

a cam, a cylinder block mounted for rotation about an axis with respect to the said cam, and comprising a plurality of cylinders, a plurality of pistons, each one being mounted for sliding in one of the said cylinders and being adapted to rest on the cam, pipes connecting each cylinder to a transverse face of the cylinder block, a valve-seat,
  which is separate from the cam, by being axially movable, but immovable in rotation with respect to said cam,
  which is connected to main pipes, a supply pipe supplying the mechanism with pressurized fluid and an ehaust pipe for said fluid,
  of which a transverse face is adapted to be held in tight contact against the said transverse face of the cylinder block, and,
  which, in the configuration where the said transverse face of the cylinder block and that of the valve-seat are in resting contact, can create a communication between each of the said cylinders respectively and the main supply and exhaust pipes, an elastic member, the effect of which tends to cause the said transverse faces of the cylinder block and of the valve-seat to move apart, a supporting element coupled to the cylinder block, a supporting means interposed between the seat and the said supporting element, and by way of which, when the fluid is working, the transverse face of the seat can be held in position against the transverse face of the cylinder block.

A means for controlling the position of the valve-seat, which is separate from the supporting means, is coupled between the said valve-seat and the said cylinder block and creates, when controlled to do so, a pressure applying the transverse face of the valve-seat on the transverse face of the cylinder block, which pressure is independent of the supporting action exercised by the supporting means.

The said position control means is advantageously constituted by a pressurized fluid jack, which is adapted to be connected to a source of pressurized fluid and which, when effectively connected to the said source, creates the aforesaid applying pressure.

The following special arrangements, adapted to a first embodiment, are also preferably adopted:

the supporting means is constituted by support studs, whereas the supporting element is mounted to move, with respect to the cylinder block, in the axial direction of any displacement of the valve-seat, and, whereas the position control device is interposed between the cylinder block and the said supporting element, which, when the said position control device is operated, is placed in solid contact with the valve-seat, transmitting the said applying pressure thereto;

the supporting element comprises a bore for receiving a cylindrical extension of the cylinder block, said extension causing the said supporting element to be mounted for sliding with respect to the said cylinder block in the direction of the axis of the valve-seat, said extensions and bores constituting a fluid jack, which is selectively connected with a source of pressurized fluid and with a non-pressurized discharge and which constitutes the said control means;

the control means further comprise a return member situated between the cylinder block and the supporting element and the effect of which tends on the contrary to move the said supporting means apart from the said seat;

the return member is constituted by an elastic member arranged between the cylinder block and an end plate which is secured to the supporting element;

the supporting element is immobilized in rotation with respect to the cylinder block by means of at least one piece integral with one of the said parts and introduced in a cavity provided in the other part;

said piece is constituted by a screw fixing the separate cylindrical extension of the cylinder block onto the said cylinder block and the head of which is contained in a cavity provided in the end plate to allow the screwing of said screw.

According to another embodiment, the arrangements defined hereunder are preferably adopted:

the valve-seat is constituted by an axially revolving member comprising at least one axial shoulder, and cooperates with an extension of the cylinder block, the revolving form of which is complementary to that of the valve-seat, which is fitted on the cylinder block and constitutes with the said axial shoulder, the working chamber of the pressurized fluid jack.

the valve-seat comprises at least two other axial shoulders, arranged in step manner, which cooperate with the said extension to constitute two enclosures connected to the said main fluid supply and exhaust pipes, whereas the supporting means is constituted by the effect of the pressure of the fluid contained in the said enclosures, and whereas the said extension constitutes the said supporting element.

The invention will be more readily understood on reading the following description with reference to the accompanying drawings, in which.

Figure 1:
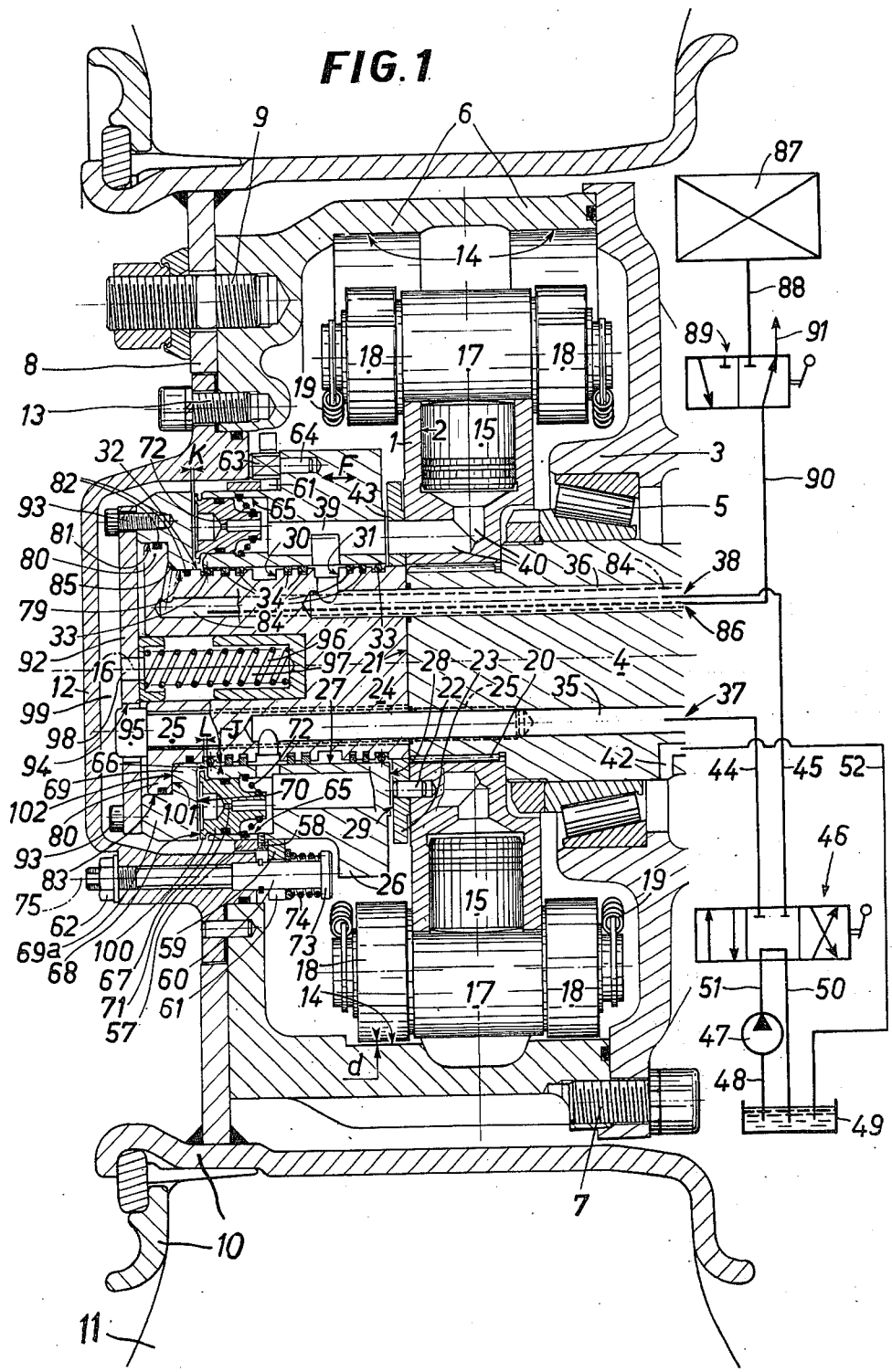
FIG. 1 is an axial cross-section of a first embodiment of hydraulic engine with the improvement according to the invention in a first configuration of operation.
Figure 2:
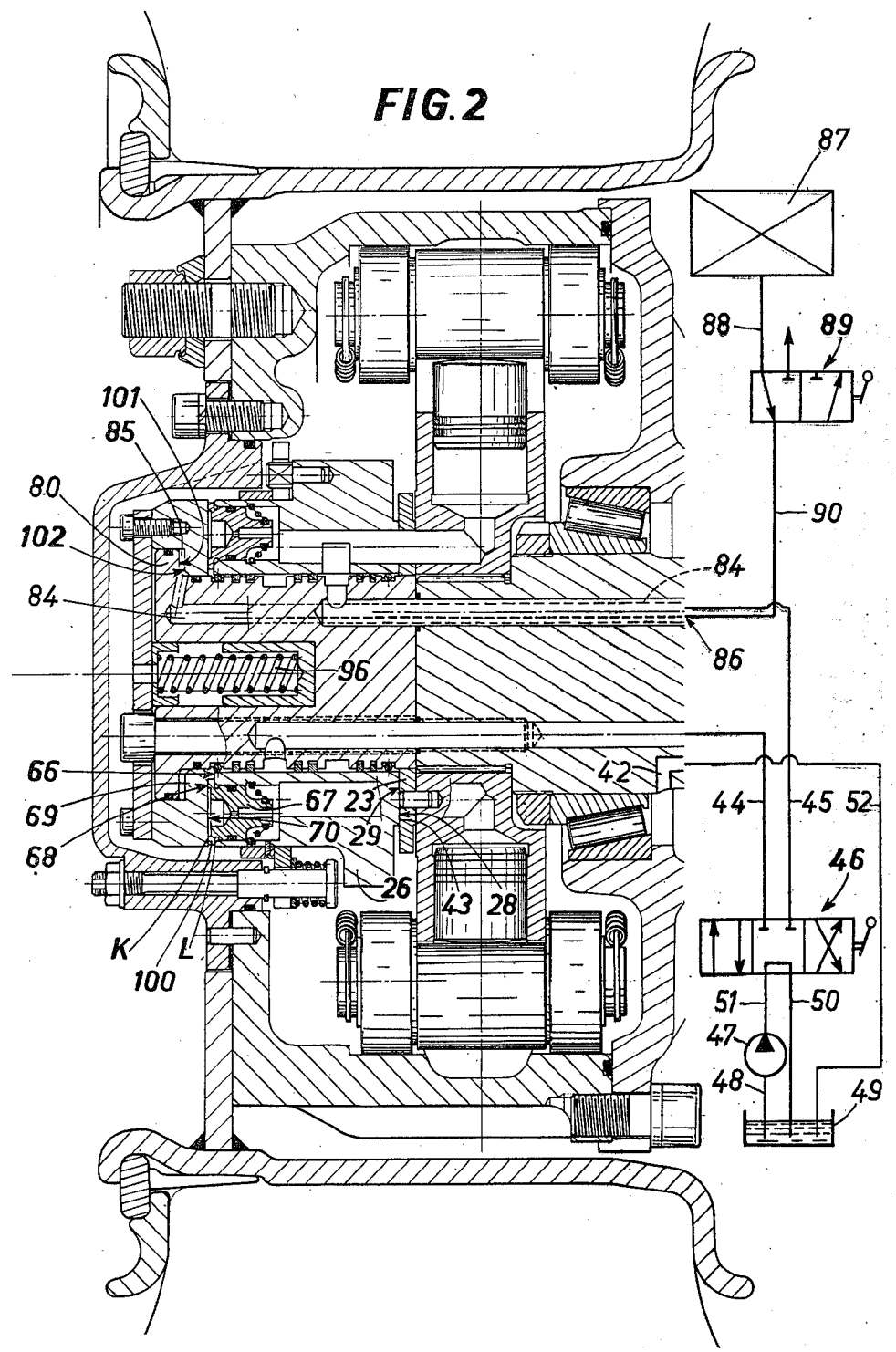
FIG. 2 is an axial cross-section similar to that of FIG. 1, of the same engine but in a second configuration of operation.
Figure 3:
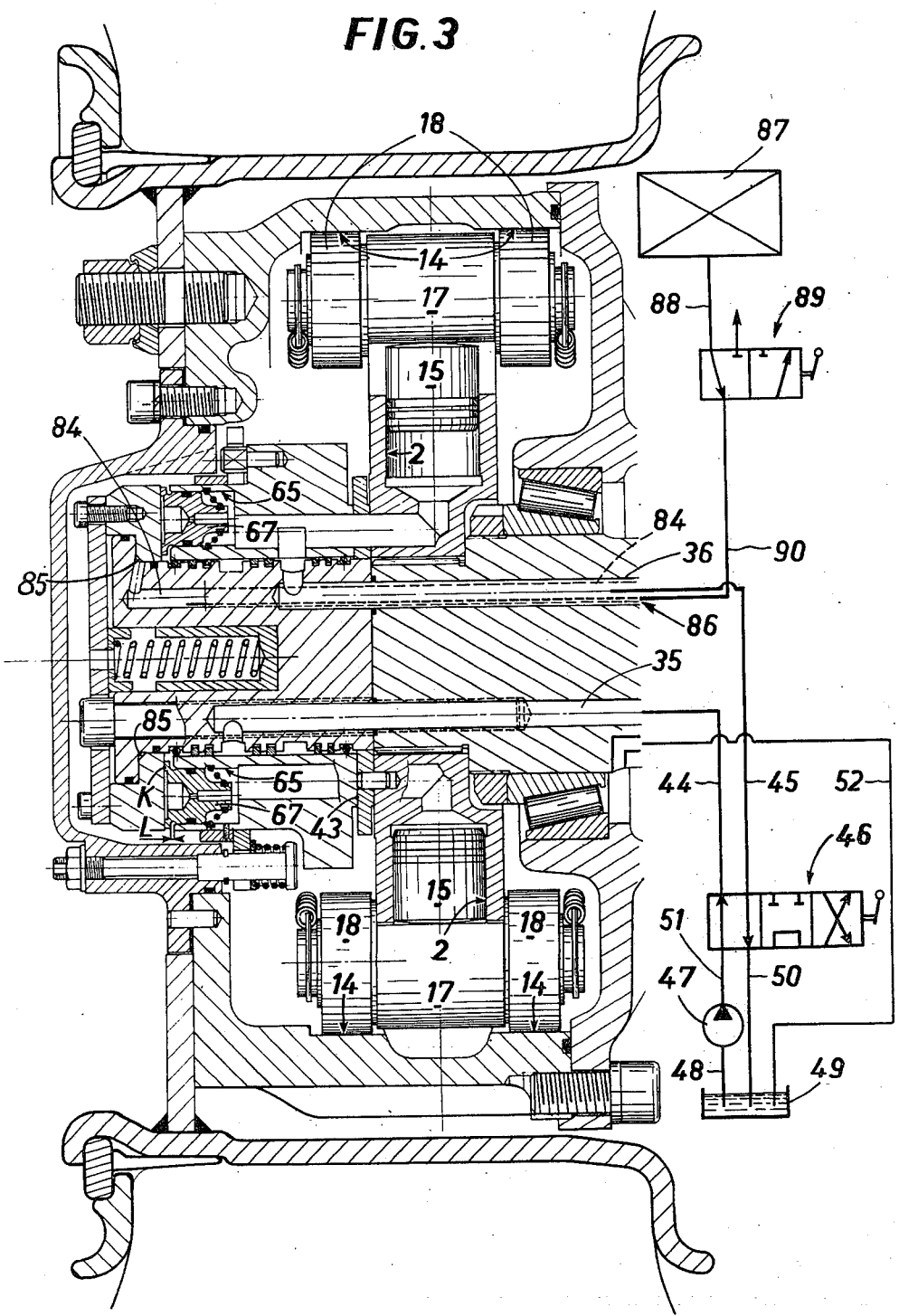
FIG. 3 is also an axial cross-section similar to that of FIG. 1, of the same engine, in a third configuration of operation.

The engine represented in FIGS. 1 to 3 is constituted by:

a cylinder block 1, cylinders 2 at regular angular distance from one another and arranged radially, a hub 3, mounted for rotation on a journal 4 by means of conical bearings 5, about an axis 16, a cam 6 with two tracks 14, which is fixed on the hub 3 by means of screws 7, a wheel rim support 8, which is fixed on the cam 6 with screws 9, and supports the rim 10 of the wheel 11, a cover 12 secured on the cam 6 with screws 13.

The hub 3, cam 6 and cover 12 assembly creates a sealed enclosure constituting the crankcase of the engine.

A piston 15 is mounted for sliding in each cylinder 2, and rests on a girder 17, the two ends of which are provided with runners 18. Springs 19 are coupled between the ends of two successive girders. When the pressurized fluid is contained in the cylinders 2, the pistons push the girders radially towards the outside, and the runners 18 also, said runners being then in running contact on the tracks 14 of the cam 6 (FIGS. 2 and 3). When on the contrary the cylinders 2 are no longer supplied with pressurized fluid, the effect of the action of the springs 19, which is described in particular in French patent application No. 78 15 070, is to recall the pistons inwardly, in a retracted position inside their respective cylinders, and to keep the runners 18 inside the top of the undulations of the tracks 14 of the cam 6 (FIG. 1). In this last configuration, a minimum distance d is thus always provided between the runners 18 and the tracks 14.

The cylinder block 1 is fast in rotation with the journal 4 by means of channels 20. A plane attrition counter-seat 23 is provided on its outmost transverse face 21 and secured by means of screws 22. In addition, a guiding cylinder 24 is fitted coaxially to the axis 16 by means of screws 25 on the end of the journal 4. A valve-seat 26 is provided with a bore 27, which is traversed by the cylinder 24 and comprises a plane face 28, situated opposite the plane transverse face 29 of the counter-seat 23.

Grooves 30 and 31 are provided in the cylinder 24 and issue into its cylindrical outer face 32, which is situated opposite the bore 27. An annular clearance J is provided and preserved between the face 32 and the bore 27, by means of ball bearings 33 arranged between the cylinder 24 and the valve-seat 26. It should be noted that the said ball bearings run freely on the bore 27 itself and as a result, allow a slight axial movement of the valve-seat 26 with respect to the cylinder 24 and to the counter-seat 23, in the direction of arrow F. The grooves 30 and 31 are isolated one from the other, and each one is isolated from the outmost transverse face of the closest seat 26, by means of compression rings 34, which are introduced in grooves provided to this effect in the cylinder 24 and which are prestressed so as to be permanently resting against the face of the bore 27 and thus be stationary with respect to the seat 26, when the pressure in the grooves 30 and 31 is nil. On the contrary, when the mechanism is working, the pressure in the grooves 30 and 31 pushes the rings 34 against the axial faces of the grooves of the cylinder 24, thereby immobilizing the said section with respect to the cylinder 24; the seat 26 then rotates with respect the rings 34.

The engine fluid system is constituted by the following pipes:

two main pipes 35 and 36, provided in the journal 4 and in the cylinder 24 which extends it, said pipes issuing at one of their end, one 35, into the groove 30, and the other 36, into the groove 31, and issuing at their other end, into branch connections 37 and 38 towards the outside of the journal 4;

a plurality of pipes 39, parallel to the axis 16, provided in the seat 26, all issuing permanently into the plane face 28 of the valve-seat 26, one in two issuing into the groove 30, and the others into the groove 31;

a plurality of other pipes 40, provided in the cylinder block 1, each one issuing into a cylinder 2 and into the face 29 of the counter-seat 23;

a pipe 42, provided in the journal 4, and connecting the inside of the crankcase (3-6-12) to the outside of the journal.

It should be specified that the valve seat 26 is fast in rotation with the cam 6 (as will be explained hereafter) and that it is mounted for relative rotation with respect to the cylinder block 1. The configuration represented in FIG. 1 is the one where an air gap 43 is provided between the plane faces, 28 of the seat 26, and 29 of the counter-seat 23. When the engine is working, the said air gap 43 is nil, the two said faces being in tight contact one against the other. During the relative rotation of the valve-seat 26 with respect to the cylinder block 1, a pipe communicates with the successive pipes 39, and as a result, with the groove 30 and with the groove 31 successively.

The main pipes 35 and 36 are connected, via pipes 44 and 45 which are external to the engine, to a three-position control valve 46. A pump 47 has its induction pipe 48 connected to a fluid reservoir 49 and its delivery pipe 51 connected to a control valve 46. A pipe 50 connects the control valve 46 to the reservoir 49.

The three positions of the control valve 46 correspond:

the first position, to creating communications between the pipes 44 and 51 and the pipes 45 and 50, the second position, to creating a communication between the pipes 50 and 51, and to blocking the pipes 44 and 45, and, the third position, to creating communications between the pipes 45 and 51 and the pipes 44 and 50.

The pipe 42 is connected to the reservoir 49 via a pipe 52.

The valve-seat 26 is made fast in rotation with the cam 6 as follows: a ring 57 is fitted on the cylindrical outer face of the seat 26 by means of screws 58, a driving plate 59 being slidable with respect to the said outer face of the seat and being adapted to come into resting contact on the ring 57. The driving plate 59 comprises four housings 61 for, firstly, two studs 60 (only one of which is shown) bolted (62) in the cover 12 and freely movable axially in the corresponding housings 61, and secondly, two further studs 63 (only one of which is shown) freely mounted (64) in housings provided in the valve-seat 26 and engaged for free axial movement in other housings 61.

Bores 65, communicating with pipes 39, are provided in the valve-seat 26 and issue into the rear face thereof. Studs 67 are mounted for sliding in the said bores and have plane rear faces 68 facing the plane transverse face 70 of a sliding disc 69. The studs 67 comprise a gauged nozzle 71 which conncts their rear faces 68 to the pipe 39 and allows the supply of fluid to the said rear faces 68, making the studs into hydrostatic slide blocks on the face 70 of the disc 69. A conical coil spring 72 is coupled between each stud 67 and the valve-seat 26, its end coils being inserted, one in a groove of the bore 65 and the other in a groove of the stud 67. The constitution and shape of the springs 72 are such that when there is no pressurized fluid in the crankcase (such as shown in FIG. 1), each spring 72 returns the corresponding stud 67 to a position in which the rear face 68 of the stud is apart from the plane face 70 of the plate 69 by a distance K.

The following characteristic feature will be noted; each stud 60 carries at its inner end a shoulder 73, a spring 74 being interposed between the said shoulder and the driving plate 59. The spring 74 is of a spiral type, with helical spirals, and works in compression, whilst being co-axial to the axis 75 of the stud 60. In the configuration of FIG. 1, the effect of this spring is to push the driving plate 59 backwards with respect to the stationary stud 60, which stud is stationary with respect to the crankcase, the said plate resting on the ring 57, which, in turn, moves the valve seat 26 apart from the cylinder block 1, thus providing a certain air-gap between them.

The sliding disc 69 is mounted for sliding on the outer face 32 of the guiding cylinder 24 by way of its central bore 79, inside which is introduced the said cylinder 24. Said guiding cylinder 24 is provided at its end with a shoulder 80 whose diameter is greater than the cross-section of the face 32, and which is itself inserted in another bore 81 provided in the sliding disc 69. Compression rings 82 are arranged between the face 32 and the bore 79, and, between the outer face 83 of the shoulder 80 and the bore 81. In addition, a conduit 84 is drilled in the journal 4 and in the guiding cylinder 24 and connects a chamber 85, provided between the guiding cylinder 24 and the sliding disc 69, and between the compression rings 82, to an outside branch connection 86. A compressor 87 has its delivery pipe 88 connected to a two-position control valve 89, which control valve is in turn connected to the branch connection 86 via a pipe 90. An exhaust pipe 91, for discharge into the atmosphere, is connected to the control valve 89.

The two positions of the control valve 89 correspond:

the first position, to creating a communication between the pipes 88 and 90 and to blocking the pipe 91; and the second position, to creating a communication between the pipes 90 and 91, and to blocking the pipe 88.

Moreover, an end plate 92 is screwed (93) in the shoulder 69a of the disc 69. Said plate is provided with as many through holes as there are screws 25 for fixing the guiding cylinder 24 on the journal 4, the heads 95 of the screws 25 being introduced in said hole 94 and cooperating with them to immobilise the plate 92 in rotation, and, as a result, the sliding disc 69 with respect to the journal 4 and thus to the cylinder block 1. In addition, a spring 96 is arranged in a cavity 97 provided in the guiding cylinder 24, between the said cylinder and the end plate 92. A hole 98 traverses the said plate opposite the cavity 97 thereby creating a communication between the said cavity and the inside 99 of the crankcase. It will also be noted, with reference to FIG. 1, that there is a clearance L between the shoulder 100 supporting the studs 67 and the rear face 66 of the valve-seat 26.

The position of different elements in relation to the three separate configurations represented is to be noted.

Referring to FIG. 1, the configuration represented therein is that of so-called "disengagement". The control valves 46 and 89 are arranged in their second respective positions. The clearances K and L are not nil, and there is an air gap 43. The volume of the chamber 85, on the contrary, is minimum, the plane face 101 of the shoulder 80 which is situated opposite the face 102 of the sliding disc 69 being in resting contact on the said face 102. The spring 96 is stretched at its maximum. The pistons 15 are retracted inside the cylinders 2 and the runners 18 are apart from the tracks 14 by at least a distance d.

Referring now to FIG. 2, the configuration represented therein is that of so-called "engagement". The control valve 46 is in its second position, the control valve 89 being in its first position. The clearances K and L as well as the air gap 43 are annulled, the face 70 of the sliding disc 69 having rested against the rear faces 68 of the studs 67 and having pushed back the latter until, on the one hand, the shoulders 100 come in resting contact on the rear face 66 of the seat 26, and on the second hand, until the face 28 of the seat 26 comes in resting contact on the face 29 of the counter-seat 23. The spring 96 is stretched at its maximum when the chamber 85 reaches its maximum volume: the face 101 of the shoulder 80 is at its maximum distance apart from the face 102 of the sliding disc 69, which distance is of course equal to the sum of the clearances K and L and of the air gap 43 of FIG. 1.

Referring now to FIG. 3, said figure represents the configuration wherein the engine is fed pressurized fluid by the pump 47; it is therefore the configuration of a vehicle drive relieved by the engine. The two control valves 46 and 89 are in their first respective position. The clearance K and the air gap are nil, but the effect of the pressurized fluid supplied to the cylinders 2 has been to push the studs 67 slightly out of the bores 65 and to restore a clearance L. Of course, the pistons 15 press against the girders 17, which latter transmit this pressure to the runners 18, which return in contact with the tracks 14. The chamber 85 recovers its maximum volume. The engine works efficiently to drive the body coupled thereto.

Figure 4:
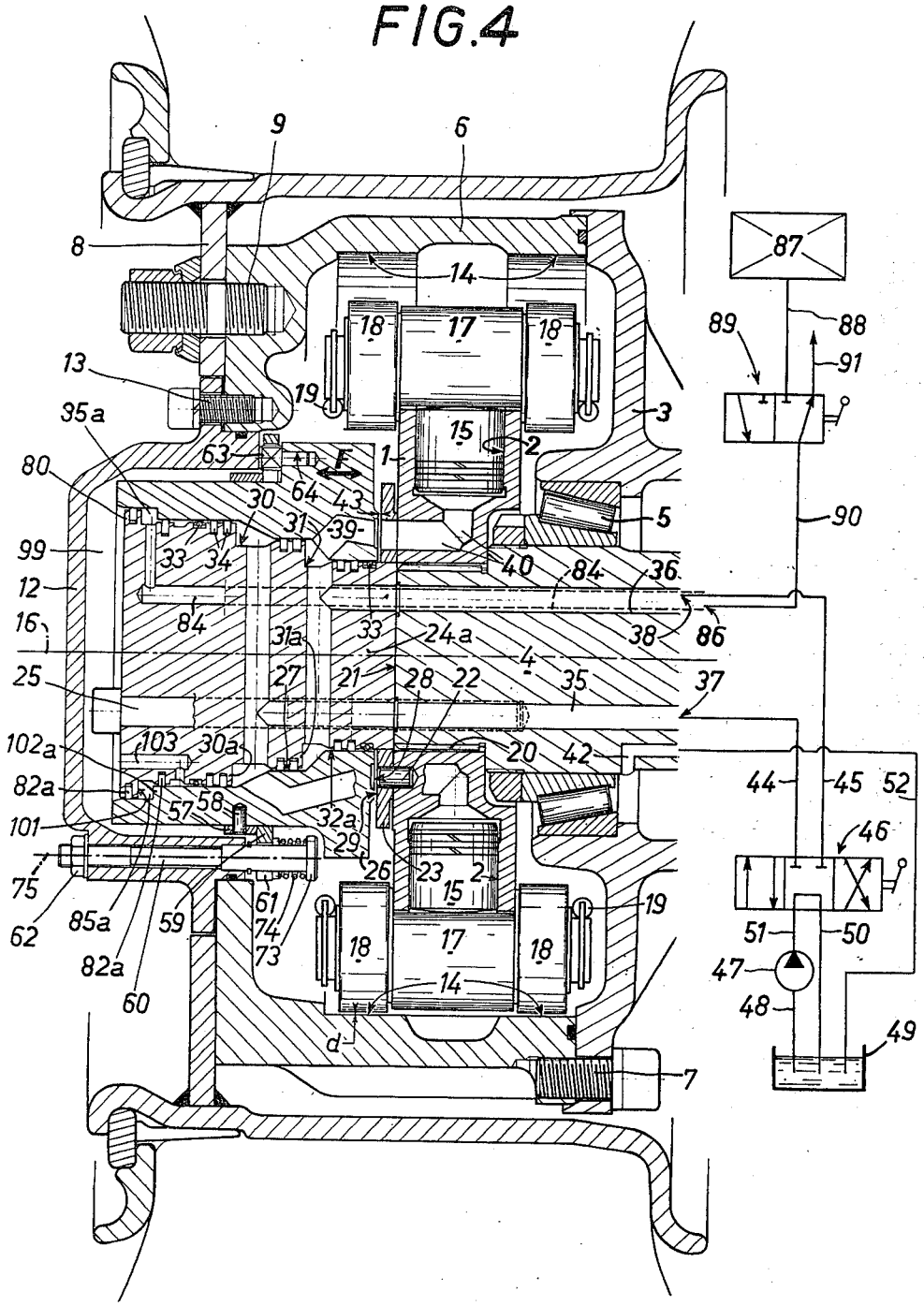
FIG. 4 is an axial cross-section of a second embodiment of hydraulic engine with the improvement according to the invention, in a first configuration of operation; and, FIG. 5 is an axial cross-section, similar to that of FIG. 4, of the same engine, but in a second configuration of operation.
Figure 5:
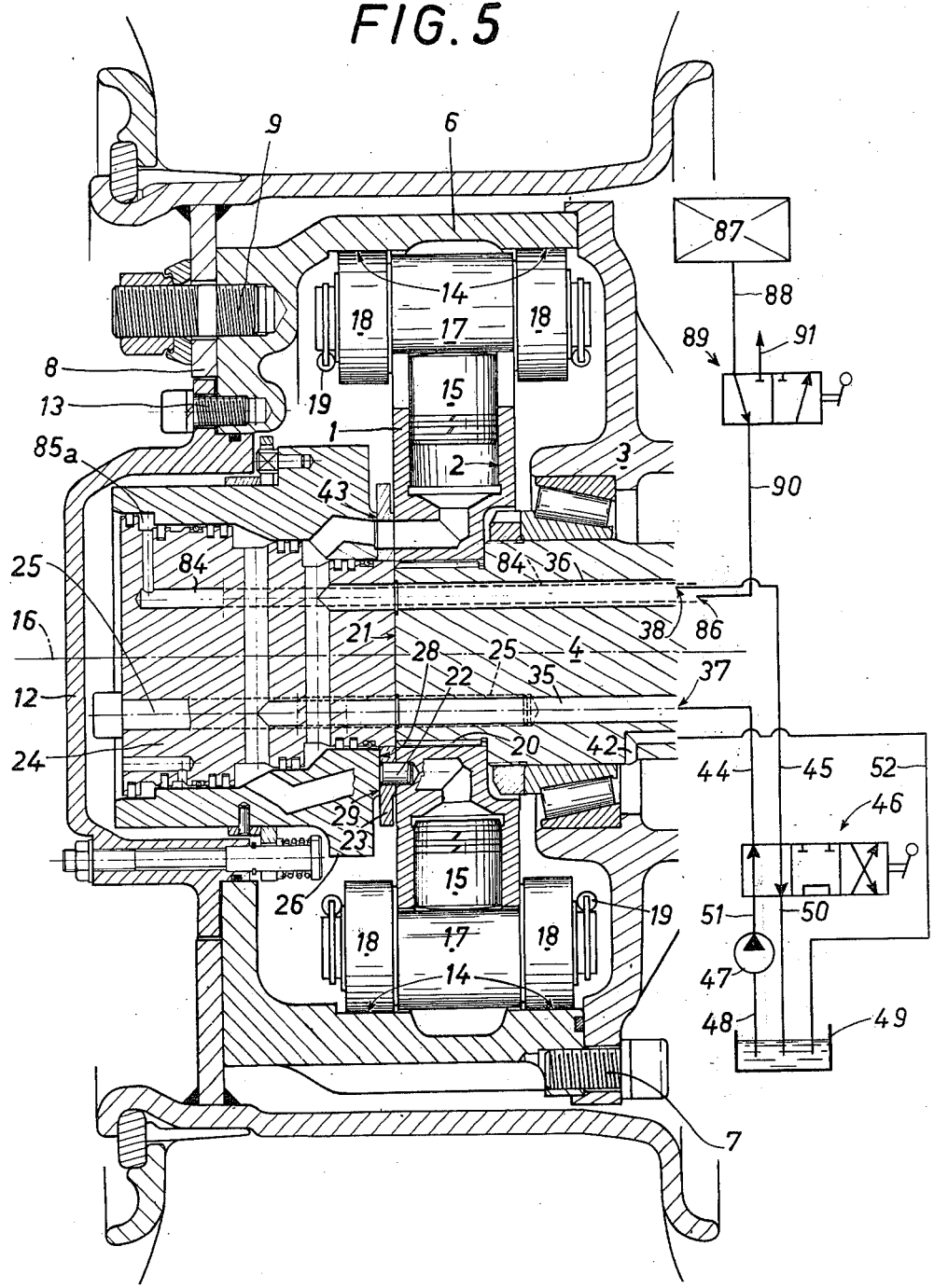

The constitution of the engine illustrated in FIGS. 4 and 5 is very similar to that of the engine described with reference to FIGS. 1 to 3. For this reason, we shall dispense from re-describing the arrangements found in the two embodiments and we shall simply refer briefly to the drawings in which identical reference numerals are used to designate the same elements of both embodiments.

It should on the contrary be noted that the engine shown in FIGS. 4 and 5 comprises special arrangements.

First, the part which extends from the cylinder block is a revolving part 24a of axial symmetry of similar axis 16 to the prior cylinder 24, and with the same guiding function, but non-cylindrical in shape, and provided with three shoulders arranged in step manner, 31a, 30a and 80. The part 24a is fixed on the journal 4 with screws 25. The shoulders 31a and 30a define the grooves 31 and 30, respectively. The valve-seat 26 still has a central bore 27, the shape of which is of course complementary to that of the revolving piece 24a. In particular, it comprises a shoulder 102a, cooperating with the shoulder 80 to define, with the face 101 of the latter, a chamber 85a. Compression rings 82a are interposed between the bore 27 and the outer revolving face 32a of the part 24a and ensures tightness between the chamber 85a and, on the one hand, a pipe 103 provided in the part 24a and connecting the housing of one of the ball bearings 33 with the inside 99 of the crankcase, and on the other hand, the said inside 99 of the crankcase.

The conduit 84, drilled inside the journal 4, and inside the revolving (and guiding) part 24a, connects the chamber 85a to an outside branch connection 86. A compressor 87 has its delivery pipe 88 connected to a two-position control valve 89 which in turn is connected to the branch connection 86 via a pipe 90. The exhaust pipe 91 discharging into the atmosphere is connected to the control valve 89.

The two positions of the control valve 89 corresponds to the definition given hereinabove for the first embodiment referred to in FIGS. 1 to 3.

The positions of different elements in relation to the two different configurations represented with reference to FIGS. 4 and 5 is to be noted.

Referring to FIG. 4, the configuration represented in said figure is that of "disengagement". The control valves 46 and 89 are respectively in their second position. Any compressed air contained in the chamber 85a, is released into the atmosphere through the pipes 84 and 90, the control valve 89 and the pipe 91. The springs 74, when coming into resting contact on the shoulders 73 of the studs 60, push back the plate 59, and at the same time the valve-seat 26, towards the left, moving the face 28 of the said valve-seat away from the face 29 of the counter-seat 23. Thus, the air gap 43 reaches its maximum value. On the contrary, the volume of the chamber 85a is minimum. The pistons 15 are retracted inside the cylinders 2 and the runners 18 are moved apart from the tracks 14 by at least a distance d.

Referring now to FIG. 5, the configuration represented in said figure is that wherein the engine is fed pressurized fluid by the pump 47; this is therefore the configuration of a vehicle drive relieved by the engine. The two control valves 46 and 89 are in their first respective positions. The air gap 43 in nil since the effect of the compressed air fed to the chamber 85a through the compressor 87, the pipe 88, the control valve 89 and the pipes 90 and 84 has been to push the valve-seat 26 towards the counter-seat 23 until their faces 28 and 29 contact. The effect of the pressurized fluid feeding the cylinders 2 is to push back the pistons, which latter by pressing against the girders 17 transmit this pressure to the runners 18, which runners are in turn brought back in contact with the tracks 14. The chamber 85a recovers its maximum volume. The engine works efficiently to drive the body coupled thereto.

Subsequently, the control valve 89 can be and actually is returned to its second position, since the pressure of the compressed air on the valve-seat 26 is no longer necessary to hold the faces 28 and 29 in contact. Indeed, the pressurized fluid contained in either one of the grooves 30, 31 has a calculated pressing effect on the valve-seat 26, which effect is precisely sufficient to hold the faces 28 and 29 in contact.

The operation of the embodiments described hereinabove will now be explained.

Concerning the embodiment shown in FIGS. 1 to 3, and starting from the disengagement configuration, the effect of the compressed air of the compressor 87, which acts in the chamber 85 by resting against the shoulder 80 of the guiding cylinder 24 is to push back the sliding disc 69 and to annul the clearances K, L and the air gap 43. It is this last point which will, thereafter, permit the virtually immediate supply of driving fluid (generally a hydraulic oil) to the cylinders 2 without any of this fluid being lost through the air gap 43.

Finally, due to the ensured possibility of annulling the air gap 43, whatever its dimension, said air gap can be chosen to be as large as the necessity of obtaining a quick discharge of the cylinders 2 requires it, during the reverse operation of disengagement. It is thus possible to select an air gap equal to between 2 and 10 mm, whereas previously, it was hardly possible to choose an air gap greater than 0.1 mm when the intention was to re-engage under the sole effect of the pressure of the driving fluid contained in the pipes 35 or 36 and in the corresponding bores.

The sliding disc 69 being slidable with respect to the guiding cylinder 24, both these parts have had to be wedged in rotation in order to avoid mutual wear: this of course is done through the cooperation of the heads of the screws 95 with the holes 94.

The object of the spring 96 is to "disengage", that is to say to move apart the faces 28 and 29 of the seat 26 and of the counter-seat 23 by moving the sliding disc 69 apart from the rear face 66 of the seat 26.

The engine shown in FIGS. 4 and 5 works much in the same way. Starting from the "disengagement" configuration (FIG. 4) the effect of the compressed air delivered by the compressor 87 into the chamber 85a (FIG. 5) is to push back the valve-seat altogether and thus to annul the air gap 43. With this configuration, the operation is the same as that of the engine shown in FIGS. 1 to 3 and with the same advantages, as explained hereinabove.

The invention is not limited to the embodiment described and modifications may be made without departing from its scope or its spirit.

What is claimed is:

1. A fluid mechanism including,
   a cam,
   a cylinder block mounted for rotation about an axis with respect to the said cam, and including a plurality of cylinders,
   a plurality of pistons, each one being mounted for sliding in one of the said cylinders and being operatively associated with said cam,
   said cylinder block including a cylinder pipe, each cylinder pipe, connecting one of said cylinders to a transverse face of said cylinder block,
   a valve-seat,
   said valve seat is axially movable with respect to said cam and immovable with respect to rotation of said cam,
   said valve seat operatively connected to a supply pipe supplying the mechanism with pressurized fluid and an exhaust pipe for removing said fluid,
   said valve seat including a means and capable of moving said valve seat to position said transverse face of said valve seat in said abutting position with said transverse face of said cylinder block,
   activation means for activating said control means to move said valve seat.

2. The mechanism of claim 1, wherein the said control means comprises a pressurized fluid jack and said activation means comprises a source of pressurized fluid connected to said fluid jack.

3. The mechanism as claimed in claim 2, wherein the valve-seat comprises an axially revolving member including at least one axial shoulder, said cylinder block including an extension having a revolving form which is complementary to that of said valve-seat, said extension fitting on said cylinder block and together with said axial shoulder forms the working chamber of said pressurized fluid jack.

4. The mechanism of claim 3, wherein the valve-seat includes at least two other axial shoulders arranged in a stepwise manner, said other shoulders cooperating with said extension forming two enclosures connected to the said main fluid supply and exhaust pipes.

5. The mechanism of claims 1 or 2, wherein the supporting means includes support studs said supporting element movably mounted on said support studs to move with respect to the cylinder block in the axial direction of any displacement of said valve-seat, and control means being interposed between the cylinder block and said supporting element such that when the said control means is activated it contacts said valve-seat moving said valve-seat into said abutting position.

6. The mechanism as claimed in claim 5, wherein said supporting element comprises a bore for receiving a cylindrical extension of the cylinder block, said supporting element operatively associated with said cylindrical extension such that it is capable of sliding with respect to the said cylinder block in the direction of the axis of the valve-seat, said extension and bores constituting a fluid jack, said fluid jack selectively connected to said source of pressurized fluid and with a pressure-less discharge.

7. The mechanism of claims 1 or 2, wherein said control means includes a return member situated between said cylinder block and said supporting element, said return member capable of moving said supporting means apart from the said seat.

8. The mechanism of claim 7, wherein the return member comprises an elastic member, and said supporting element includes an end plate, said return member arranged between said cylinder block and said end plate.

9. The mechanism as claimed in claim 8, wherein said supporting means is immobilized in rotation with respect to the cylinder block by means of at least one piece integral with one of said parts and introduced in a cavity provided in the other part.

10. The mechanism as claimed in claim 9, wherein said piece comprises a screw fixing said cylindrical extension of the cylinder block onto said cylinder block, the head of said screw being contained in a cavity provided in said end plate in a manner allowing the screwing of said screw.

* * * * *

UNITED STATES PATENT AND TRADEMARK OFFICE
CERTIFICATE OF CORRECTION

PATENT NO. : 4,326,450
DATED : APRIL 27, 1982
INVENTOR(S) : SERGE B. BACQUIE

It is certified that error appears in the above-identified patent and that said Letters Patent are hereby corrected as shown below:

> Column 9, (Claim 1) Line 49, after the words, "said valve seat including a ..." and before the words (on Line 49) "...means and capable...", enter the following clauses: --transverse face capable of being held in an abutting position against the said transverse face of the cylinder block and when in said abutting position creating a fluid passageway between each of the said cylinders respectively and said main supply and said exhaust pipe,
> 
> an elastic member capable of causing said transverse faces of the cylinder block and said valve seat to move with respect to each other from said abutting position,
> 
> a supporting element coupled to the cylinder block,
> 
> a positioning means interposed between said valve set and said supporting element and capable of holding said transverse face of said valve seat against said transverse face of said cylinder block in said abutting position when fluid is supplied to said mechanism from said supply pipe the improvement which comprises:
> 
> a control means independent of said positioning--.

UNITED STATES PATENT AND TRADEMARK OFFICE
CERTIFICATE OF CORRECTION

PATENT NO. : 4,326,450

DATED : APRIL 27, 1982

INVENTOR(S) : SERGE B. BACQUIE

It is certified that error appears in the above-identified patent and that said Letters Patent is hereby corrected as shown below:

Column 10 (Claim 9) Line 46, after the word "supporting", the word "means" should be changed to read --element--.

Signed and Sealed this

Thirtieth Day of August 1983

[SEAL]

Attest:

GERALD J. MOSSINGHOFF

Attesting Officer

Commissioner of Patents and Trademarks